United States Patent
Prevost et al.

(10) Patent No.: US 10,242,450 B2
(45) Date of Patent: Mar. 26, 2019

(54) COUPLED SEGMENTATION IN 3D CONVENTIONAL ULTRASOUND AND CONTRAST-ENHANCED ULTRASOUND IMAGES

(71) Applicant: KONINKLIJKE PHILIPS N.V., Eindhoven (NL)

(72) Inventors: Raphael Manua Michel Prevost, Eindhoven (NL); Roberto Jose Ardon, Eindhoven (NL); Benoit Jean-Dominique Bertrand Maurice Mory, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/924,440

(22) Filed: Mar. 19, 2018

(65) Prior Publication Data

US 2018/0211391 A1    Jul. 26, 2018

Related U.S. Application Data

(63) Continuation of application No. 14/424,087, filed as application No. PCT/IB2013/056676 on Aug. 16, 2013, now Pat. No. 9,934,579.

(30) Foreign Application Priority Data

Aug. 30, 2012 (EP) ..................... 12306033

(51) Int. Cl.
*G06K 9/00* (2006.01)
*G06T 7/11* (2017.01)
(Continued)

(52) U.S. Cl.
CPC .............. *G06T 7/11* (2017.01); *G06T 3/0006* (2013.01); *G06T 7/12* (2017.01); *G06T 7/149* (2017.01);
(Continued)

(58) Field of Classification Search
None
See application file for complete search history.

(56) References Cited

U.S. PATENT DOCUMENTS

| 6,544,179 B1 | 4/2003 | Schmiesing et al. |
| 7,650,025 B2 | 1/2010 | Guetat et al. |

(Continued)

OTHER PUBLICATIONS

"Kidney Detection and Real-Time Segmentation in 3D Contrast-Enhanced Ultrasound Images" Prevost et al, Biomedical Imaging IEEE, May 2, 2012, p. 1559-1562.

(Continued)

*Primary Examiner* — Wei Wen Yang (57) ABSTRACT

The present invention relates to an ultrasound imaging system (10) for inspecting an object (97) in a volume (40). The ultrasound imaging system comprises an image processor (36) configured to conduct a segmentation (80) of the object (97) simultaneously out of three-dimensional ultrasound mage data (62) and contrast-enhanced three-dimensional ultrasound image data (60). In particular, this may be done by minimizing an energy term taking into account both the normal three-dimensional ultrasound image data and the contrast-enhanced three-dimensional image data. By this, the normal three-dimensional ultrasound image data and the contrast-enhanced three-dimensional image data may even be registered during segmentation. Hence, this invention allows a more precise quantification of one organ in two different modalities as well as the registration of two images for simultaneous visualization.

20 Claims, 8 Drawing Sheets

(51) Int. Cl.
*G06T 3/00* (2006.01)
*G06T 7/12* (2017.01)
*G06T 7/149* (2017.01)
*G06T 7/174* (2017.01)

(52) U.S. Cl.
CPC .......... *G06T 7/174* (2017.01); *G06T 2200/04* (2013.01); *G06T 2207/10136* (2013.01); *G06T 2207/20112* (2013.01); *G06T 2207/20116* (2013.01); *G06T 2207/20161* (2013.01); *G06T 2207/30056* (2013.01); *G06T 2207/30084* (2013.01)

(56) References Cited

U.S. PATENT DOCUMENTS

| | | |
|---|---|---|
| 2009/0275831 A1 | 11/2009 | Hall |
| 2009/0326363 A1 | 12/2009 | Lu |
| 2010/0222671 A1* | 9/2010 | Cohen ................. A61B 5/0044 600/424 |
| 2010/0290693 A1 | 11/2010 | Cohen |
| 2012/0082354 A1 | 4/2012 | Peters et al. |
| 2013/0182924 A1 | 7/2013 | Lause |
| 2015/0213613 A1 | 7/2015 | Prevost |
| 2015/0294497 A1* | 10/2015 | Ng ....................... A61B 8/0891 382/128 |

OTHER PUBLICATIONS

"A Variational Framework for Integrating Segmentation and Registration Through Active Contours" Yezzi et al, Medical Image Analysis, vol. 7, No. 2 Jun. 1, 2003 p. 171-185.
"Active Contours Without Edges" Chan et al, IEEE Transactions on Image Processing, vol. 10, No. 2, Feb. 1, 2001.
"Multimodal Image Coregistration and Partitioning . . . " Ashburner et al, Neuroimage 6, Feb. 17, 1997, p. 209-217.
"Multimodal Integration of Medical Ultrasound for Treatment Planning and Interventions" W. Wein, Dissertation University of Munich 2007.
B. Mory et al "Template Deformation With User Constraints for Live 3D Interactive Surface Extraction", Proceedings of MICCAI'11 Worshop Meshmed, 2011.
R. Prevost et al "Kidney Detection and Real-Time Segmenation in 3D Contrast-Enhanced Ultrasound Images", Proceedings of ISBI 2012.

\* cited by examiner

COUPLED SEGMENTATION IN 3D CONVENTIONAL ULTRASOUND AND CONTRAST-ENHANCED ULTRASOUND IMAGES

The present application is a continuation of U.S. patent application Ser. No. 14/424,087 filed Feb. 26, 2015, which is the U.S. National Phase application under 35 U.S.C. § 371 of International Application No. PCT/IB2013/056676, filed Aug. 16, 2013, which claims the benefit of EP Application Serial No. 12306033.7 filed Aug. 30, 2012. These applications are hereby incorporated by reference herein.

FIELD OF THE INVENTION

The present invention relates to three-dimensional ultrasound imaging. In particular, the current invention relates to image processing and the segmentation of objects in the scanned volume.

BACKGROUND OF THE INVENTION

In three-dimensional ultrasound imaging, or volume imaging, the acquisition of a three-dimensional image is accomplished by conducting many two-dimensional scans that slice through the volume of interest. Hence, a multitude of two-dimensional images is acquired that lie next to another. By proper image processing, a three-dimensional image of the volume of interest can be built out of the multitude of two-dimensional images. The three-dimensional information acquired from the multitude of two-dimensional images is displayed in proper form on a display for the user of the ultrasound system.

Further, so-called live three-dimensional imaging, or 4D imaging, is often used in clinical applications. In live three-dimensional imaging, a real-time view on the volume can be acquired enabling a user to view moving parts of the anatomical site, for example a beating heart or else. In the clinical application of live three-dimensional imaging there is sometimes a need to image a relatively small area of the heart such as a single valve, or a septal defect, and there is sometimes the need to image a large area of the heart such as an entire ventricle.

Unlike conventional or normal ultrasound (US), contrast-enhanced ultrasound (CEUS) enables a real-time three-dimensional visualization of the blood flow. This recent modality is gaining more interest as it is harmless for the patient—since no radiation and non-toxic contrast agent may be used—while providing different and useful information. Vascularised organs such as the kidneys or the liver are completely enhanced while their surroundings produce little signal.

Image segmentation is a common task for radiologists. The extracted surface can be used either to quantify the volume of an organ or a tumor, or as a landmark to perform feature-based image registration. However, it is often tedious to manually segment an organ in a 3D image. While quantification and visualization tools are relatively available for 2D images, 3D volumes analysis is often done by hand through tedious procedures impossible to realize in clinical practice. However, such methods do not provide satisfying results. Precise segmentations are therefore needed, but difficult to obtain, especially in ultrasound images which are corrupted by a lot of noise and various artifacts.

Document US 2009/0326363 A1 discloses a method for the registration of medical images. The method registers a previously obtained volume onto an ultrasound volume during an ultrasound procedure to produce a multimodal image. The multimodal image may be used to guide a medical procedure. The multimodal image includes magnetic resonance imaging (MRI) and/or magnetic resonance spectroscopy imaging (MRSI) information presented in the framework of a transrectal ultrasonography (TRUS) image during a TRUS procedure.

There is a need for improved automatic or at least computer-aided segmentation tools.

SUMMARY OF THE INVENTION

It is an object of the present invention to provide an improved ultrasound system and method. It is a further object of the present invention to provide a computer program for implementing such method.

In a first aspect of the present invention an ultrasound imaging system is presented that for inspecting an object in a volume. The ultrasound imaging system comprises an image processor configured to receive image data and to provide display data, wherein the image processor is configured to receive three-dimensional ultrasound image data and contrast-enhanced three-dimensional ultrasound image data, and to conduct a segmentation of the object simultaneously out of the three-dimensional ultrasound image data and contrast-enhanced three-dimensional ultrasound image data.

In a further aspect of the present invention a method for segmenting an object out of a three-dimensional ultrasound image is presented. The method comprises the steps of providing three-dimensional ultrasound image data and contrast-enhanced three-dimensional ultrasound image data, and segmenting the object simultaneously out of the three-dimensional ultrasound image data and the contrast-enhanced three-dimensional ultrasound image data.

In a further aspect of the present invention a computer program is presented comprising program code means for causing a computer to carry out the steps of such method when said computer program is carried out on the computer.

The basic idea of the invention is to use two sets of image data that are both acquired via ultrasound imaging—normal three-dimensional ultrasound image data and contrast-enhanced three-dimensional ultrasound image data—and to search simultaneously in both data sets to segment the object.

It has been found that an automatic segmentation in ultrasound images in general is very challenging because of the limited field of view, shadows and attenuation, ambiguous image information due to noise and other various artifacts specific to US or CEUS. Moreover, US and CEUS images both have different advantages and difficulties. For example, tumors are usually less differentiable from normal tissues in US than in CEUS; whereas neighboring organs or blood vessels may hinder segmentation in CEUS images. Relying on only one ultrasound image is therefore not robust enough, and other information is needed.

Unlike other modalities such as computer tomography (CT), simultaneous acquisition of both normal and contrast-enhanced three-dimensional images is theoretically possible. The two images are thus naturally aligned. However, it is possible that both normal and contrast-enhanced three-dimensional images are acquired subsequently. Then, registering of the images is needed. Registering US images towards CEUS images—or vice versa—has in itself a clinical interest because it would allow the fusion of two different kinds of information. The proposed invention provides a segmentation of an object from a three-dimensional US and a three-dimensional CEUS image. The two volumes do not need to be aligned since the registration transform can be estimated during the segmentation.

Hence, it is proposed to use simultaneously two different images, which will improve existing segmentation results. The segmentation uses complementary information in that the US image provides anatomical information, whereas the CEUS image shows the vascularization. If some parts of the target organ boundary are unclear or even missing in one of the two images, it would further be possible to extrapolate the segmentation with the information from the other image.

Preferred embodiments of the invention are defined in the dependent claims. It shall be understood that the claimed method has similar and/or identical preferred embodiments as the claimed device and as defined in the dependent claims.

In one embodiment, the image processor is further configured to provide display data using at least one of the segmented three-dimensional ultrasound image data and the segmented contrast enhanced three-dimensional ultrasound image data, and wherein the ultrasound emitting system further comprises a display configured to receive the display data and to provide an image.

The segmented three-dimensional ultrasound image data and the segmented contrast enhanced three-dimensional ultrasound image data is acquired via the previously conducted segmentation of the object. By this, the segmented object can be presented to a user on the display of the ultrasound imaging system. In particular, the segmented object can be provided simultaneously as a normal ultrasound image and a contrast enhanced ultrasound image.

In a further embodiment, the image processor is configured to conduct the segmentation by minimizing an energy term so that a deformed initial geometric shape substantially corresponds to the objects boundary. The initial geometric shape is deformed such that it matches the objects boundary as good as possible when said energy term is at is minimum. In a particular application, for example by applying a Laplacian operator and as explained in more detail later on, an image gradient flux across the surface of a deformed initial geometric shape is maximized.

It has been found that a model based method using a previously specified initial geometric shape that is transformed during the segmentation process provides a robust converging method to find and segment the object in both the normal ultrasound imaging data and the contras enhanced ultrasound imaging data.

The segmentation comprises deforming an initial model, e.g. an initial model that roughly represents the shape of the target object. As an example, in case that the target object is a kidney, the initial shape might be an ellipsoid. This shape is represented by an implicit function, i.e. a function $\phi$, defined in the whole space, which is positive inside the shape and negative outside. The shape is then the zero level-set of such a function. The whole implicit function will be deformed by a space transformation $\psi$. In particular, the zero level-set will change and so will the corresponding object. This transformation is decomposed into two transformations of different kinds $\psi = \mathcal{L} \circ \mathcal{G}$:

- $\mathcal{G}$ is a global transformation that can translate, rotate or rescale the initial shape. It will basically correct the initial ellipsoid if needed.
- $\mathcal{L}$ is a local deformation that will actually deform the object so that it matches more precisely the object to segment in the image.

The goal of the method is then to find the best $\mathcal{L}$ and $\mathcal{G}$, using the image I information. This is done by minimizing the following energy:

$$\int H(\phi \circ \mathcal{L} \circ \mathcal{G}(x))r(x) + \lambda \int \|\mathcal{L}(x) - x\|^2.$$

In the first term, also called data fidelity, H is the Heaviside function (H(x)=1 if x>0 and 0 if x<0) which means that the integral is actually only inside the deformed object. r(x) is an image-based function that returns at each point a negative (respectively positive) value if the voxel is likely to be outside (respectively inside) the object of interest. For ambiguous regions, r(x) is set to zero. The second term, is the so called regularization. The second term is the norm between $\mathcal{L}$ and the identity function. The amplitude of the deformation is penalized because the object shape should not deviate too much from an ellipsoid. It is to be emphasized that this second term is independent from the position and orientation of the object which was the purpose of the decomposition of the transformation. The minimization of such energy is performed using a gradient descent on both $\mathcal{L}$ and $\mathcal{G}$ at the same time.

In our application, we want to segment two different images $I_1$ and $I_2$ with exactly the same object which is a fair assumption when dealing with a lot of organs, in particular kidneys, or if both US and CEUS images have been acquired at the same time.

If the two images were already perfectly registered, then the previously described equation can easily be extended by adding another data fidelity term:

$$\int H(\phi \circ \mathcal{L} \circ \mathcal{G}(x))r_1(x) + \int H(\phi \circ \mathcal{L} \circ \mathcal{G}(x))r_2(x) + \lambda \int \|\mathcal{L}(x) - x\|^2$$

However, a registered acquisition might only take place if both US and CEUS images are acquired simultaneously. If this is not the case, for example because of hardware limitations, the two images are not aligned. This is taken into account with another transformation. In general, this transformation might be non-rigid and of any type. However, in the particular case of a rigid organ exam, such as a kidney, or if—for any other reason—an assumption of looking for the same object can be made, this transformation (denoted $\mathcal{G}_{12}$) can be rigid, i.e. it allows a global change of position and orientation but only with the same size. The transformation $\mathcal{G}_{12}$ could also be set to any affine transform, e.g. to take into account volume changes, without loss of computational efficiency. The energy then becomes $$\int H(\phi \circ \mathcal{L} \circ \mathcal{G}(x))r_1(x) + \int H(\phi \circ \mathcal{L} \circ \mathcal{G}(x))r_2 \alpha \mathcal{G}_{12}(x) + \lambda \int \|\mathcal{L}(x) - x\|^2$$

Basically, it corrects the image information coming from the second term by the transformation $\mathcal{G}_{12}$.

The third term is constructed as a constraint to the local deformation. It penalizes if the local deformation causes the shape of the object to deviate too much from the initial geometric shape. Hence, as we search for a minimum, in case the first and the second term lead to the same results, the solution transforming the initial geometric shape less than the other solutions will be considered best. The parameter "λ" may be set to determine the relevance of this constraint.

For the US and CEUS applications, the kidney has a different contrast in the two images. It is darker than the background in the US image and brighter in the CEUS image. To take this into account, a minus sign is to be added before the corresponding term in the energy. For example, if the US image data is to be registered to the CEUS image data, the second term has to be added a minus sign. The optimization is also performed by gradient descent but simultaneously on $\mathcal{L}$, $\mathcal{G}$ and $\mathcal{G}_{12}$. At the end, a segmentation as the zero level-set of the function $\phi \circ \mathcal{L} \circ \cong$ is more precise because it used the information of the two images. Further, estimate of the transformation $\mathcal{G}_{12}$ which allows to register the two images is achieved, for example for visualization purposes.

In a further embodiment, the energy term comprises a first term representing the three-dimensional ultrasound image data and a second term representing the contrast enhanced three-dimensional ultrasound image data, wherein the deformed initial geometric shape is the same in both the first and the second term, and wherein one of the first and second terms comprises a registering transformation registering the three-dimensional ultrasound image data and the contrast enhanced three-dimensional ultrasound image data.

As previously explained, the (normal) three-dimensional ultrasound image data (US image) might be registered towards the contrast enhanced three-dimensional ultrasound image data (CEUS image). However, the registration can also be performed vice versa, i.e. the contrast enhanced three-dimensional ultrasound image data is registered towards the three-dimensional ultrasound image data.

By this, when segmenting the object out of the three-dimensional ultrasound image data and the contrast enhanced three-dimensional ultrasound image data, at the same time the registering transformation can be found. There is no need to register the three-dimensional ultrasound image data and the contrast enhanced three-dimensional ultrasound image data previously towards the segmentation. Rather, the registration of the two image data sets is performed simultaneously to the segmentation. The geometric transformation that aligns them is therefore available as a side outcome. This enables to register the three-dimensional ultrasound image data and the contrast enhanced three-dimensional ultrasound image data and to provide registered images to a user of the ultrasound imaging system simultaneously.

In a further embodiment, a deformation of the initial geometric shape is conducted by a applying a global transformation and a non-rigid local transformation on the initial geometric shape, wherein the global transformation translates, rotates and scales the initial geometric shape, and wherein the non-rigid local transformation applies a displacement field, in particular having built-in smoothness, on the initial geometric shape, and wherein the energy term further comprises a third term constraining the non-rigid local transformation.

This construction of the energy term provides for the advantage that deforming the initial geometric shape that roughly corresponds to the object to be segmented, may not be deformed too much during transformation. This is achieved by separating the deformation of the initial geometric shape into a global transformation translating and rotating and scaling the initial geometric shape and a separate local transformation that deforms the initial geometric shape. By this, the method can further apply a third term penalizing the local transformation deviating the shape of the object too much from the initial geometric shape. By this, segmentations which are close to the initial geometric shape are favored by the algorithm.

In a further embodiment, the image processor is further configured to initialize the segmentation by detecting the object in the contrast-enhanced three-dimensional ultrasound image data through estimating a center, a size and an orientation of a basic geometric shape and to provide the initial geometric shape by the estimated center, size and orientation of the basic geometric shape.

By this, the initial geometric shape can be found that provides a better start to the segmentation than the basic geometric shape. For example, in case the scanned object is a kidney, the basic geometric shape might an ellipsoid. The initial geometric shape might then be found as an ellipsoid already oriented and centered and sized to roughly correspond to the actual position of the kidney in the image data.

In a further embodiment, the image processor further configured to initialize a registration of a three-dimensional ultrasound image data and the contrast enhanced three-dimensional ultrasound image data by detecting the initial geometric shape in the three-dimensional ultrasound image data only by conducting a translation and rotation of the initial geometric shape provided by the initialization of the segmentation in the contrast enhanced three-dimensional ultrasound image data.

Estimating an ellipsoid in the normal three-dimensional ultrasound (US) image data is more difficult. However, by using the initial geometric shape already found in the contrast-enhanced (CEUS) image data during the initialization process of the segmentation, only for a translation and rotation may be searched in the normal three-dimensional ultrasound image data. Once this is conducted, a registration between the normal three-dimensional ultrasound image data and the contrast enhanced three-dimensional ultrasound image data as an initialization for the registration can be obtained.

In a further embodiment, the image processor is further configured in that the registering transformation is affine.

Generally, the registering transformation applied in one of the first and second terms of the energy term can be a general transformation or non-rigid transformation. The registration transformation might be any kind of global linear transformation. In particular, it can be an affine transformation. An affine transformation is a transformation which preserves straight lines and ratios of distances between points lying on a straight line. An affine transformation is equivalent to a linear transformation followed by a translation. Depending on the scanned object it might also be a similarity or an affine transformation. In case the object is, for example, a kidney, it can assumed that its shape remains the same even if the normal three-dimensional ultrasound image data and the contrast enhanced three-dimensional ultrasound image data is acquired subsequently and not at the same time. This is because ultrasound diagnostics do not deform the kidney during scanning and the kidney is enclosed in a rather rigid tissue. Similar boundary conditions might apply to scanning the pancreas and the spleen. In such cases, a rigid transform may be applied to simplify and speed up the segmentation and registration process.

In a further embodiment, the ultrasound imaging system is designed for inspecting a kidney of the patient, wherein the image processor is further configured in that the segmentation is initialized by estimating a basic geometric shape, wherein the basic geometric shape is an ellipsoid, and wherein the registering transformation is rigid.

It has been found that the proposed ultrasound emitting system and methods are in particular advantageous in scanning the kidney. This is not only because a rigid transformation might be applied as the registering transformation but also since the geometric shape of the kidney can be estimated as an ellipsoid. Further, as blood streams through the kidney, contrast-enhanced three-dimensional ultrasound imaging is particularly suitable for scanning a kidney.

However, it has to be emphasized that the suggested system and methods also can be applied to the inspection of any other organ of a patient or object within a patient. Other suitable basic geometrical shapes might also be found for the spleen, the pancreas, the liver or a heart of a patient.

In a further embodiment, the ultrasound imaging system further comprises a transducer array configured providing an ultrasound receive signal, a beam former configured to control the transducer array to scan the volume, and further configured to receive the ultrasound receive signal and to provide an image signal, a controller for controlling the beam former, and a signal processor configured to receive the image signal and to provide three-dimensional image data and contrast-enhanced three-dimensional image data.

By this, a fully functioning ultrasound imaging system capable to acquire both normal three-dimensional image data and to provide it to the image processor and also capturing contrast-enhanced three-dimensional image data and providing it to the image processor is provided. This enables a user to scan a body of a patient and to view the segmented object simultaneously both as a normal ultrasound image and a contrast-enhanced ultrasound image.

In a further embodiment, there is provided a method for providing a three-dimensional ultrasound image of an object in a volume, wherein the method comprises the steps of inputting three-dimensional ultrasound image data of a volume and the contrast-enhanced three-dimensional ultrasound image data of the volume, processing the three-dimensional ultrasound image data and the contrast-enhanced three-dimensional ultrasound image data according to the method for segmenting an object out of a three-dimensional ultrasound image and according to an aspect of the invention, and to provide segmented three-dimensional ultrasound image data and segmented contrast-enhanced three-dimensional ultrasound image data, processing at least one of the segmented three-dimensional ultrasound image data and the segmented contrast-enhanced three-dimensional ultrasound image data to provide display data and displaying a three-dimensional ultrasound image using the display data.

By this, a three-dimensional ultrasound image showing the segmented object can be provided to a user. The ultrasound image might be a normal three-dimensional ultrasound image or a contrast-enhanced three-dimensional ultrasound image or even both. Further, if both images are provided, they may also be registered.

In a further embodiment, the step of inputting the three-dimensional ultrasound image data of the volume and the contrast-enhanced three-dimensional ultrasound image data of the volume comprises the steps of ultrasound scanning the volume with a transducer array providing an ultrasound signal, contrast-enhanced ultrasound scanning of the volume with a transducer array providing a contrast-enhanced ultrasound signal and processing the ultrasound signal to provide three-dimensional ultrasound image data, and processing the contrast-enhanced ultrasound signal to provide three-dimensional contrast-enhanced ultrasound image data.

By this, the object can be scanned by a user and the user can then view this segmented object on a display. The step of ultrasound scanning the volume with a transducer array providing an ultrasound signal is referred to as "step S1" in the following, the step of contrast-enhanced ultrasound scanning the volume with a transducer array providing a contrast-enhanced ultrasound signal is referred to as "step S2" in the following. In particular, it has to be emphasized that the steps S1 and S2 do not need to be applied in the specific order. They may also be conducted in the other order, i.e. first a contrast-enhanced ultrasound scanning is conducted and then a normal ultrasound scanning is conducted, or they may be conducted simultaneously.

Hence, in a further embodiment the step of ultrasound scanning the volume with a transducer array providing an ultrasound signal and the step of contrast-enhanced ultrasound scanning the volume with a transducer array providing a contrast-enhanced ultrasound signal may be conducted subsequently or simultaneously.

This may provide the possibility to simultaneously scan the object normally and contrast-enhanced if the transducer provides for such scanning. However, it can also be the case that the normal scanning and the contrast-enhanced scanning are conducted in a certain order depending on the systems available and the patient's condition.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
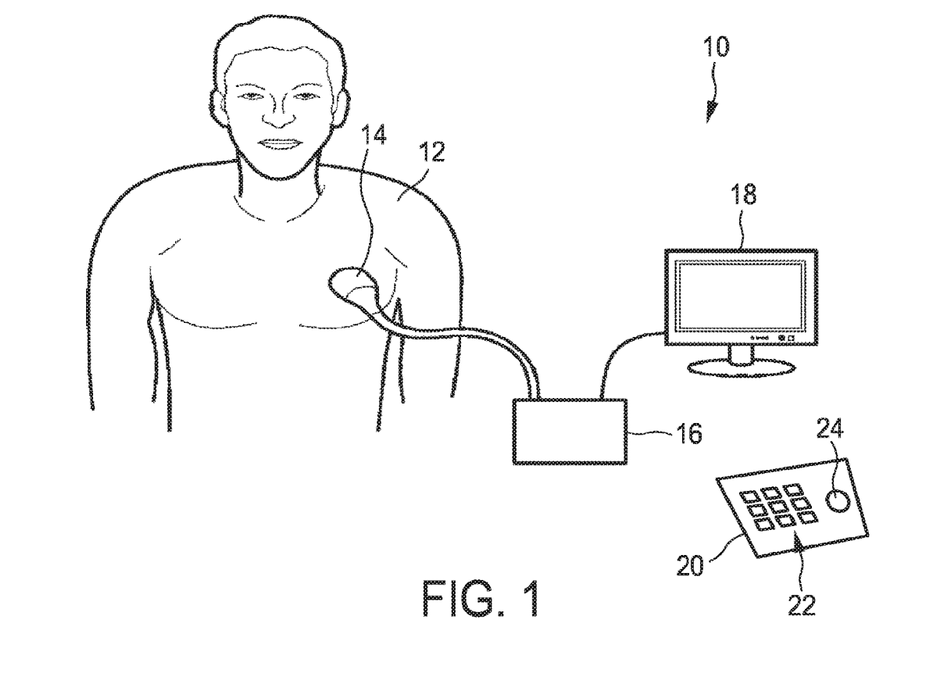
FIG. 1 shows a schematic representation of an ultrasound imaging system in use to scan a volume of a patient's body.

FIG. 1 shows a schematic illustration of an ultrasound system 10 according to an embodiment, in particular a medical ultrasound three-dimensional imaging system. The ultrasound imaging system 10 is applied to inspect a volume of an anatomical site, in particular an anatomical site of a patient 12. The ultrasound system 10 comprises an ultrasound probe 14 having at least one transducer array having a multitude of transducer elements for transmitting and/or receiving ultrasound waves. In one example, the transducer elements each can transmit ultrasound waves in form of at least one transmit impulse of a specific pulse duration, in particular a plurality of subsequent transmit pulses. The transducer elements can for example be arranged in a one-dimensional row, for example for providing a two-dimensional image that can be moved or swiveled around an axis mechanically. Further, the transducer elements may be arranged in a two-dimensional array, in particular for providing a multi-planar or three-dimensional image.

In general, the multitude of two-dimensional images, each along a specific acoustic line or scanning line, in particular scanning receive line, may be obtained in three different ways. First, the user might achieve the multitude of images via manual scanning. In this case, the ultrasound probe may comprise position-sensing devices that can keep track of a location and orientation of the scan lines or scan planes. However, this is currently not contemplated. Second, the transducer may be automatically mechanically scanned within the ultrasound probe. This may be the case if a one dimensional transducer array is used. Third, and preferably, a phased two-dimensional array of transducers is located within the ultrasound probe and the ultrasound beams are electronically scanned. The ultrasound probe may be handheld by the user of the system, for example medical staff or a doctor. The ultrasound probe 14 is applied to the body of the patient 12 so that an image of an anatomical site in the patient 12 is provided.

Further, the ultrasound system 10 has a controlling unit 16 that controls the provision of a three-dimensional image via the ultrasound system 10. As will be explained in further detail below, the controlling unit 16 controls not only the acquisition of data via the transducer array of the ultrasound probe 14 but also signal and image processing that form the three-dimensional images out of the echoes of the ultrasound beams received by the transducer array of the ultrasound probe 14.

The ultrasound system 10 further comprises a display 18 for displaying the three-dimensional images to the user. Further, an input device 20 is provided that may comprise keys or a keyboard 22 and further inputting devices, for example a track ball 24. The input device 20 might be connected to the display 18 or directly to the controlling unit 16.

Figure 2:
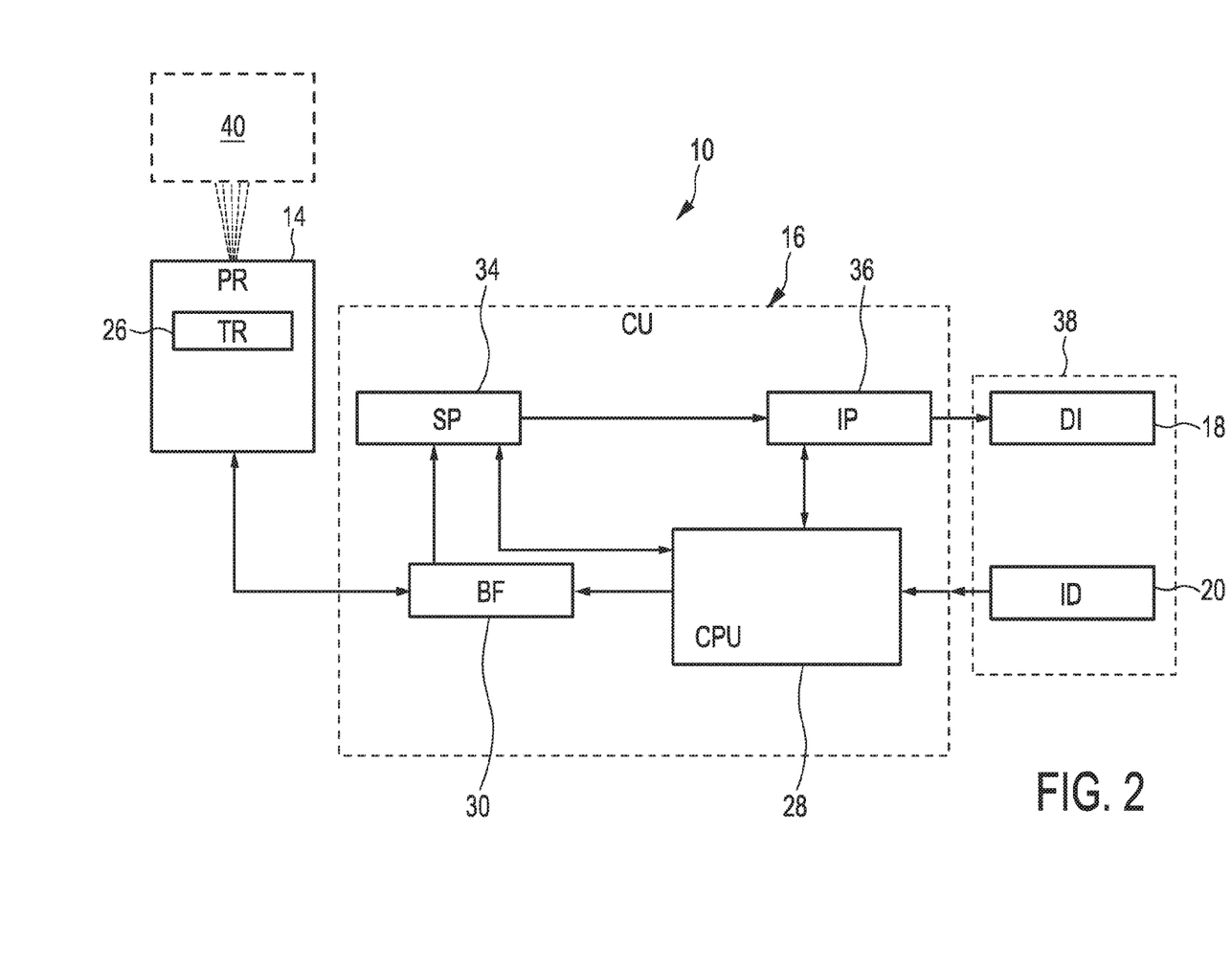
FIG. 2 shows a schematic block diagram of an embodiment of an ultrasound imaging system.

FIG. 2 shows a schematic block diagram of the ultrasound system 10. As already laid out above, the ultrasound system 10 comprises an ultrasound probe (PR) 14, the controlling unit (CU) 16, the display (DI) 18 and the input device (ID) 20. As further laid out above, the probe (PR) 14 comprises a phased two-dimensional transducer array 26. In general, the controlling unit (CU) 16 may comprise a central processing unit that may include analog and/or digital electronic circuits, a processor, microprocessor or the like to coordinate the whole image acquisition and provision. Further, the controlling unit 16 comprises a herein called central processing unit 28. However, it has to be understood that the central processing unit 28 does not need to be a separate entity or unit within the ultrasound system 10. It can be a part of the controlling unit 16 and generally be hardware or software implemented. The current distinction is made for illustrative purposes only. The central processing unit (CPU) 28 as part of the controlling unit 16 may control a beam former and, by this, what images of the volume 40 are taken and how these images are taken. The beam former (BF) 30 generates the voltages that drives the transducer array (TR) 26, determines parts repetition frequencies, it may scan, focus and apodize the transmitted beam and the reception or receive beam(s) and may further amplify filter and digitize the echo voltage stream returned by the transducer array 26. Further, the central processing unit 28 of the controlling unit 16 may determine general scanning strategies. Such general strategies may include a desired volume acquisition rate, lateral extent of the volume, an elevation extent of the volume, maximum and minimum line densities, scanning line times and the line density as already explained above. The beam former 30 further receives the ultrasound signals from the transducer array 26 and forwards them as image signals.

Further, the ultrasound system 10 comprises a signal processor (SP) 34 that receives the image signals. The signal processor 34 is generally provided for analogue-to-digital-converting, digital filtering, for example, band pass filtering, as well as the detection and compression, for example a dynamic range reduction, of the received ultrasound echoes or image signals. The signal processor forwards image data.

Further, the ultrasound system 10 comprises an image processor (IP) 36 that converts image data received from the signal processor 34 into display data finally shown on the display 18. In particular, the image processor 36 receives the image data, preprocesses the image data and may store it in an image memory. These image data is then further post-processed to provide images most convenient to the user via the display 18. In the current case, in particular, the image processor 36 may form the three-dimensional images out of a multitude of two-dimensional images in each slice.

A user interface is generally depicted with reference numeral 38 and comprises the display 18 and the input device 20. It may also comprise further input devices, for example, a mouse or further buttons which may even be provided on the ultrasound probe 14 itself.

A particular example for a three-dimensional ultrasound system which may apply the current invention is the CX40 CompactXtreme Ultrasound system sold by the applicant, in particular together with a X6-1 or X7-2t TEE transducer of the applicant or another transducer using the xMATRIX technology of the applicant. In general, matrix transducer systems as found on Philips iE33 systems or mechanical 3D/4D transducer technology as found, for example, on the Philips iU22 and HD15 systems may apply the current invention.

Figure 3:
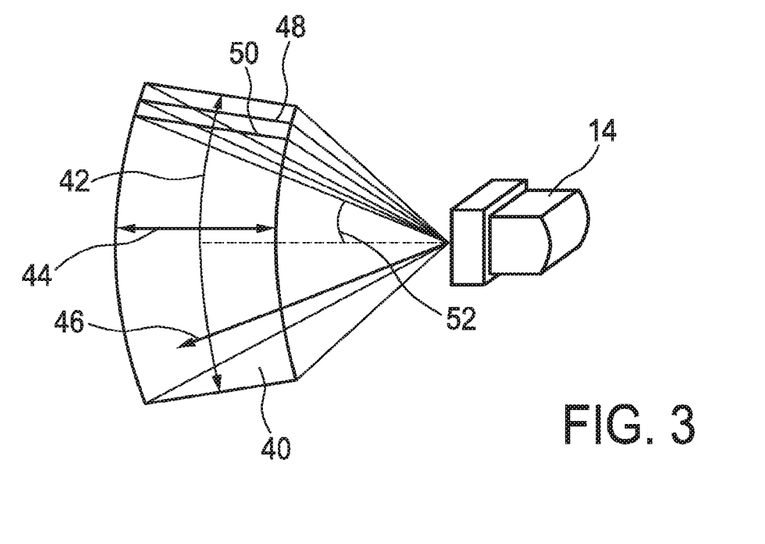
FIG. 3 shows an illustration of a volume scanned by a probe head.

FIG. 3 shows an example of a volume 40 relative to the ultrasound probe 14. The exemplary volume 40 depicted in this example is of a sector type, due to the transducer array of the ultrasound probe 14 being arranged as a phased two-dimensional electronically scanned array. Hence, the size of the volume 40 may be expressed by an elevation angle 42 and a lateral angle 44. A depth 46 of the volume 40 may be expressed by a so-called line time in seconds per line. That is the scanning time spent to scan a specific scanning line.

The volume 40 may be divided into a multitude of slices 48, 50 or two-dimensional images. Only two slice 48, 50 are depicted for illustrative purposes. Actually, a multitude of slices 48, 50 having different elevational angles 52 are spread over the volume 40. Of course, the slices 48, 50 may also be oriented in the elevational direction and spread across the volume 40 in the lateral direction. During image acquisition, the two-dimensional transducer array of the ultrasound probe 14 is operated by a beam former in a way that the volume 40 is scanned along a multitude of these scan lines within each of the slices 48, 50 sequentially. In multi-line receive processing, a single transmit beam might illuminate a multitude, for example four, receive scanning lines along which signals are acquired in parallel. If so, such sets of receive lines are then electronically scanned across the volume 40 sequentially.

Figure 4:
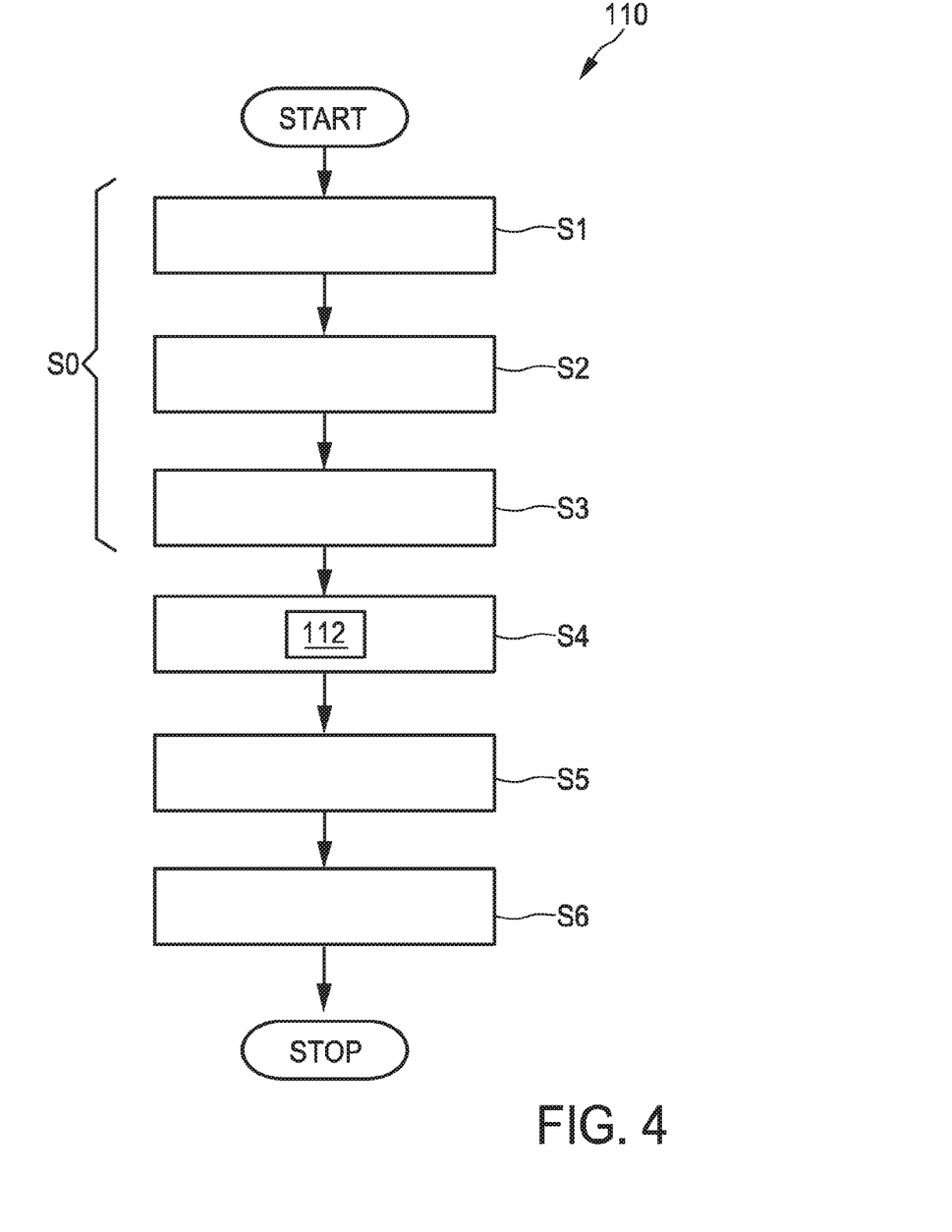
FIG. 4 shows a flow diagram of an embodiment of method for providing a three-dimensional ultrasound image of an object.

FIG. 4 shows an embodiment of a method to provide a three-dimensional ultrasound image of an object in the volume 40. After the method has started, a first step S0 of inputting the three-dimensional ultrasound image data of the volume 40 and the contrast-enhanced three-dimensional ultrasound image data of the volume 40 may be conducted. In particular, this step S0 might comprise three steps S1, S2 and S3. In step S1, the volume is (normally) ultrasound scanned with a transducer array providing an ultrasound signal. In step S2, a contrast-enhanced ultrasound scanning of the volume, in particular previously provided with a contrast agent, with a transducer array providing a contrast-enhanced ultrasound signal is conducted. The steps S1 and S2 can also be conducted simultaneously or step S2 can be conducted prior to step S1.

In step S3 the ultrasound signal and the contrast-enhanced ultrasound signal is processed to provide three-dimensional ultrasound image data and contrast-enhanced three-dimensional ultrasound image data.

This three-dimensional ultrasound image data and contrast-enhanced three-dimensional ultrasound image data is provided, for example to the image processor 36 of the ultrasound imaging system. Then, in step S4, a method 112 for segmenting an object out of a three-dimensional ultrasound image is conducted that segments the object simultaneously out of the three-dimensional ultrasound image data and the contrast-enhanced three-dimensional ultrasound image data. This method will be described in more detail below.

Subsequently, at least one of the segmented three-dimensional ultrasound image data and the segmented contrast-enhanced three-dimensional ultrasound image data is processed to provide display data.

In a step S6 the display data is then used to provide a three-dimensional ultrasound image. The three-dimensional ultrasound image might comprise a normal ultrasound image and/or a contrast-enhanced three-dimensional ultrasound image. If both images are displayed, they may also be registered.

Figure 5A:
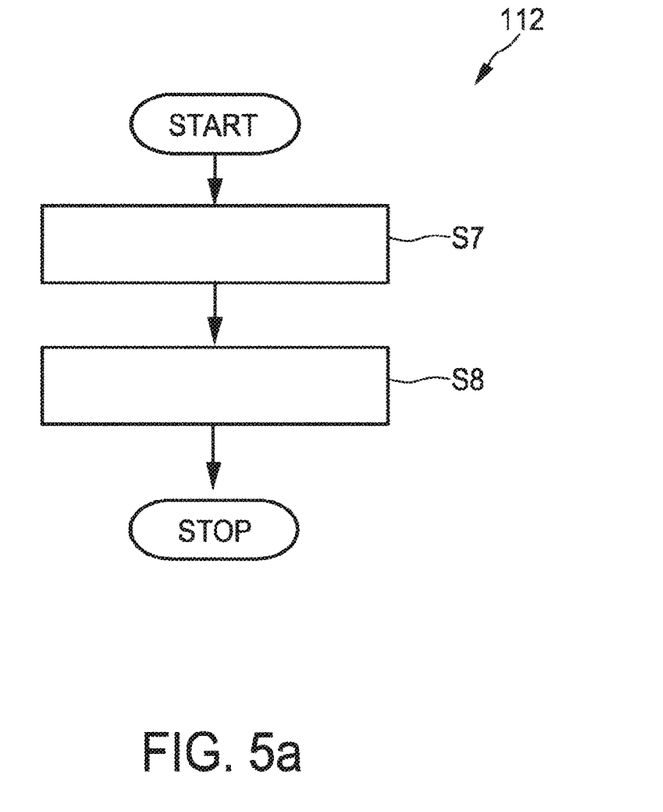
FIG. 5*a* shows a flow diagram of an embodiment of method for segmenting an object out of a three-dimensional ultrasound image.

FIG. 5a shows the steps conducted in the method 112 for segmenting the object.

After starting, three-dimensional ultrasound image data and contrast-enhanced three-dimensional ultrasound image data is provided. In step S8 the object is simultaneously segmented out of the three-dimensional ultrasound image data and the contrast-enhanced three-dimensional ultrasound image data.

In our application, we want to segment two different images $I_1$ and $I_2$ with exactly the same object which can be a fair assumption when dealing with a lot of organs, in particular kidneys, or if both US and CEUS images have been acquired at the same time.

If the two images were already perfectly registered, then the previously described equation can easily be extended by adding another data fidelity term:

$$\int H(\phi \circ \mathcal{L} \circ \mathcal{G}(x))r_1(x) + \int H(\phi \circ \mathcal{L} \circ \mathcal{G}(x))r_2(x) + \lambda \|\mathcal{L}(x)-x\|^2$$

However, a registered acquisition might only take place if both US and CEUS images are acquired simultaneously. It is very unlikely that the US and CEUS images are registered if acquired subsequently. Hence, this is taken into account with another transformation. In general, this transformation might be non-rigid and of any type. However, in particular in case of a rigid organ exam, such as a kidney exam, or if an assumption of looking for the same object can be made, this transformation (denoted $\mathcal{G}_{12}$) can be rigid, i.e. it allows a global change of position and orientation but only with the same size. The transformation $\mathcal{G}_{12}$ could also be set to any affine transform, e.g. to take into account volume changes, without loss of computational efficiency. The energy then becomes $$\int H(\phi \circ \mathcal{L} \circ \mathcal{G}(x))r_1(x) + \int H(\phi \alpha \mathcal{L} \circ \mathcal{G}(x))r_2 \circ \mathcal{G}_{12}(x) + \lambda \|\mathcal{L}(x)-x\|^2$$

Basically, it corrects the image information coming from the second term by the rigid transformation $\mathcal{G}_{12}$.

The third term is constructed as a constraint to the local deformation. It penalizes if the local deformation causes the shape of the object to deviate too much from the initial geometric shape. Hence, as we search for a minimum, in case the first and the second term lead to the same results, the solution transforming the initial geometric shape less than the other solutions will be considered best. The parameter "λ" may be set to determine the relevance of this constraint.

For the US and CEUS applications, for example in the case of the object being a kidney, the object has a different contrast in the two images. It is darker than the background in the US image and brighter in the CEUS image. To take this into account, a minus sign is to be added before the corresponding term in the energy. For example, if the US image data is to be registered to the CEUS image data, the second term has to be added a minus sign. The optimization is also performed by gradient descent but simultaneously on $\mathcal{L}'$, $\mathcal{G}$ and $\mathcal{G}_{12}$. At the end, a segmentation as the zero level-set of the function $\phi \circ \mathcal{L} \circ \mathcal{G}$ is more precise because it used the information of the two images. Further, estimate of the transformation $\mathcal{G}_{12}$ which allows to register the two images is achieved, for example for visualization purposes.

Figure 5B:
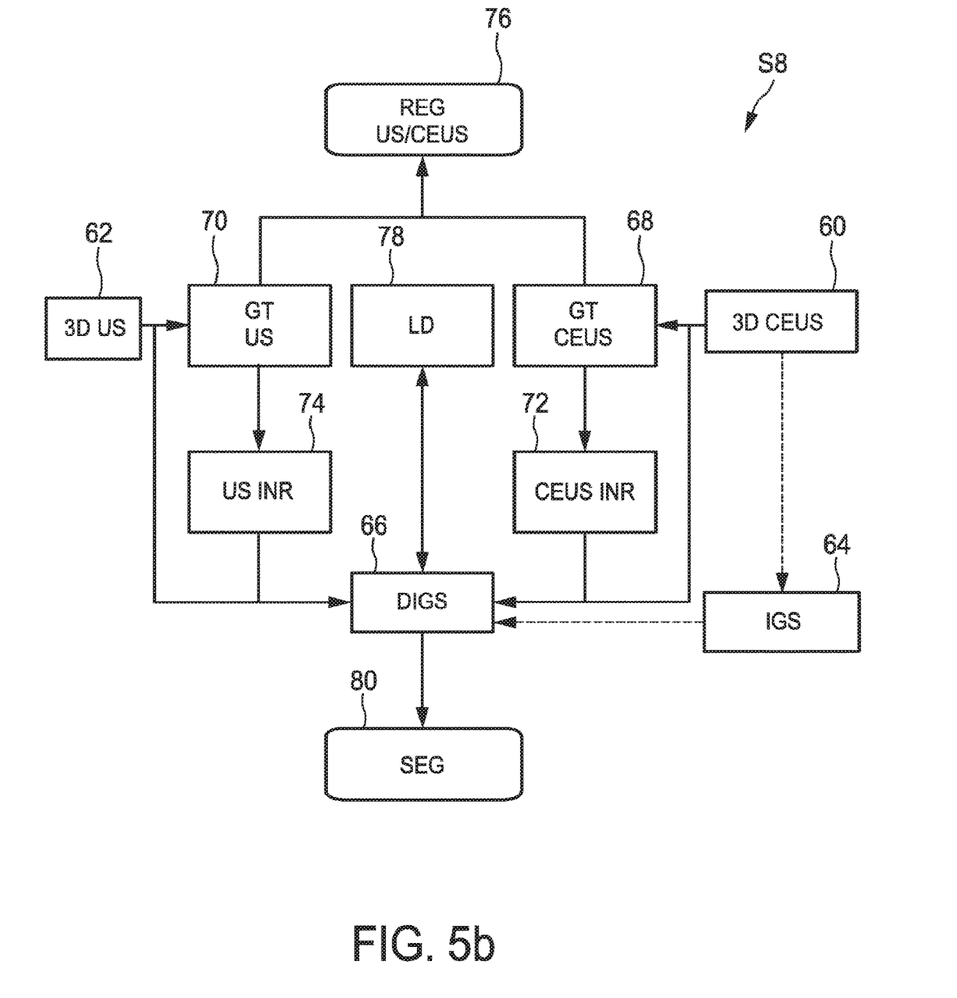
FIG. 5*b* shows a flow diagram of a detailed embodiment of the segmentation step of the method in FIG. 5*a*.

FIG. 5b shows an embodiment how step S8 conducting the segmentation is to be conducted. In this embodiment, also a registration of the three-dimensional ultrasound image data and the contrast-enhanced three-dimensional ultrasound image data can be acquired simultaneously.

The actual segmentation is obtained by deforming a initial geometric shape with two transformations, a global one that takes into account rotation, translation and scaling and a local one which actually modifies the initial geometric shape. The two transformations are found by minimizing a region competition energy so that the deformed shape matches the target object's boundary in the image data. In this embodiment, two image based terms are used in the energy term so that both US and CEUS are taken into account. As the two image data sets are not necessarily registered, one of the two image-based terms has to be corrected by a transformation. If for example the kidney is to be scanned, an assumption can be made that a kidney is not deformed during the acquisition of the normal ultrasound image data and the contrast-enhanced ultrasound image data so that a rigid transform can be applied only translating and rotating. Then, the energy with respect to the global transform, the local transform and the rigid transform between the US and the CEUS image can be optimized.

At first, the segmentation may be initialized by finding an initial geometric shape 64. This initialization of the segmentation may be conducted as follows. CEUS images of organs, in particular of a kidney, show a cortical enhancement shortly followed by a medullary enhancement. Better visualization of kidney tissue is then available as it is highly hyperechoic whereas its fatty surrounding produces no signal. Since kidney shape can be roughly approximated by an ellipsoid, the kidney detection problem in CEUS images can be initially reduced to finding the smallest ellipsoid encompassing most of the hyperechoic voxels. Methods such as Hough transforms have been proposed to detect ellipses in images. However their extension to three dimensions, though possible, is usually computationally expensive mainly because of the number of parameters to estimate (nine parameters for a three-dimensional ellipsoid). On the other hand, statistical approaches like robust Minimum Volume Ellipsoid (MVE) estimators are better suited but require prior knowledge on the proportion of outliers, here the noise and artefacts), which may vary from one image to another and is thus not available.

An already presented method may be used to robustly estimate the ellipsoid's center $c \in \mathbb{R}^3$ and size/orientation encoded by a 3×3 positive-definite matrix M. Robustly excluding outliers is done by estimating a weighting function w (defined over the image domain $\Omega$ into [0, 1]) that provides a confidence score for any point x to be an inlier. Let $I:\Omega \subset \mathbb{R}^3 \to \mathbb{R}^+$ be the grayscale volume, it is searched c, M and w as minimizers of the following detection energy:

$$E_d(c, M, w) = \\ -\int_\Omega \phi(x)I(x)w(x)dx + \mu \cdot \log\left(\frac{Vol(M)}{|\Omega|}\right) \cdot \left(\int_\Omega I(x)w(x)dx\right) \quad (1)$$

with $\phi(x) = 1 - (x-c)^T M(x-c)$ and $Vol(M) = \frac{4\pi}{3}\sqrt{\det M^{-1}}$ the ellipsoid volume.

The ellipsoid is implicitly represented by $\phi$ (which is positive inside), thus the first term of $E_d$ induces the ellipsoid to include as many bright voxels as possible. The role of w is to neglect the influence of outliers. The second term penalizes the volume of the ellipsoid Vol(M) with respect to the domain volume $|\Omega|$. It is weighted by a trade-off parameter $\mu>0$ and normalized by $\int I w$.

$E_d$ has a statistical meaning: when w is fixed, its minimizers (c*,M*) are respectively the centroid and proportional to the inverse of the covariance matrix of all voxels, weighted by Iw. Besides, $E_d$ is linear with respect to w which is by definition restricted to [0; 1]. Therefore, at every voxel x the minimizer w*(x) is equal to 0 or 1, depending only on the sign of $$\phi - \mu \log\left(\frac{Vol(M)}{|\Omega|}\right) w^*$$

is then the indicator of the current ellipsoid estimation which has been dilated proportionately to $\mu$.

The choice of $\mu$ is paramount. For an ideal case (white ellipsoid on a black background), the method provides the exact solution if $\mu=\frac{1}{4}$ (in 2D) or $\mu=\frac{1}{5}$ (in 3D). In practice, values close to these ones should be chosen.

The minimization of $E_d$ is performed with an alternate iterative scheme that successively updates the variables c, M and w, as summarized in table (1). As the energy $E_d$ decreases at each step, the energy converges to a local minimum. In practice, few iterations are required for convergence and computation time is less than a second on a standard computer.

A method to implement the above explained formula and already known to a person skilled in the art may read as shown in the following table:

TABLE 1

Robust ellipsoid detection method

Algorith initialization $\forall x \in \Omega$, w(x) ← 1
repeat
 // Estimation of center c and matrix $\mathcal{M}$ $c \leftarrow \frac{1}{\int_\Omega I_w} \int_\Omega I(x) w(x) \times dx$ $\mathcal{M}^{-1} \leftarrow \frac{2}{\mu \int_\Omega I_w} \int_\Omega I(x) w(x)(x-c)(x-c)^T dx$ // Update of the weighting function w for each $x \in \Omega$ if $(x-c)^T \mathcal{M}(x-c) \leq 1 - \mu \log\left(\frac{Vol(\mathcal{M})}{|\Omega|}\right)$ then
   w(x) ← 1
 else
   w(x) ← 0
until convergence;

Hence, the above method known to person skilled in the art may be used to initialize the segmentation. Having found this initial geometric shape, however, it has been found that also the registration 76 may be initialized. This may be conducted by searching for the initial geometric shape 64 also in the normal three-dimensional ultrasound image data only by translating and rotating the initial geometric shape. By this, an initial geometric transformation between the normal three-dimensional ultrasound image data and the contrast-enhanced three-dimensional ultrasound image data can be provided. This geometric transformation is estimated by an exhaustive search (on translations and rotations) in the normal three-dimensional ultrasound image of the previously estimated ellipsoid. Then, having provided initializations for block 64 and 76 and having provided the three-dimensional ultrasound image data 62 and the contrast-enhanced three-dimensional ultrasound image data 60, the actual segmentation can take place. The segmentation works as follows.

The previously detected ellipsoid will now be deformed according to the previously described framework to segment the kidney more precisely. In the particular application, the image-based term is set to $r(x)=\pm \Delta I(x)$ where the $\Delta$-operator denotes the Laplacian operator. Mathematically, minimizing the Laplacian of the image inside an object means that the normal vectors of the object's surface should match the image gradient; that is to say, the segmentation method will look for bright-to-dark edges (or dark-to-bright, depending on the multiplying sign). The non-rigid local deformation $\mathcal{L}$ is expressed using a displacement field u such that $\mathcal{L}(x)=x+(u*K_C)(x)$. $K_\sigma$ is a Gaussian kernel that provides built-in smoothness. Denoting the US image or US image data $I_1$ and the CEUS image or CEUS image data $I_2$, the final energy reads $$\int H(\phi \circ \mathcal{L} \circ \mathcal{G}(x))(\Delta I_1(x) - \Delta I_2 \circ \mathcal{G}_{12}(x)) + \lambda \|(u*K_\sigma)(x)\|^2$$

This energy is minimized, with respect to the parameters of $\mathcal{G}$, the parameters of $\mathcal{G}_{12}$ and each component of the vector field u, through a gradient descent.

In FIG. 5b, the global transformation of the ultrasound image data 70 and the global transformation of the contrast-enhanced ultrasound image data 68 are shown to be conducted transforming both image data into a reference system. The normal three-dimensional ultrasound image data in a block 74 and the contrast-enhanced ultrasound image data is transformed in a block 72. However, of course, it may be the case that the coordinate system of either the normal three-dimensional ultrasound image data or the contrast-enhanced ultrasound image data may be used as the referential system so that only one of the normal three-dimensional ultrasound image data and the contrast-enhanced three-dimensional ultrasound image data needs to be really transformed. Simultaneously, a local deformation 78 is conducted as explained above. This leads to the deformed model of 66 of the initial geometric shape 64 as explained above. By applying this deformed model of the initial geometric shape, for example in case of a kidney an ellipsoid, the object can be segmented out of the normal three-dimensional ultrasound image data and the contrast-enhanced three-dimensional ultrasound image data in block 80. As a side outcome, as the normal three-dimensional ultrasound image data and the contrast-enhanced three-dimensional ultrasound image data have to be globally and locally deformed in the same reference system, a transformation registering the normal three-dimensional ultrasound image data and the three-dimensional ultrasound image data is found as block 76.

Figure 6A:
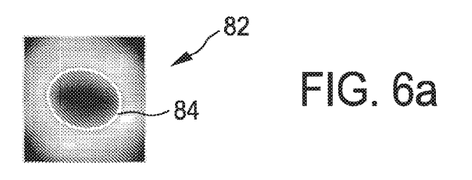
FIGS. 6*a* to 6*c* show examples to explain the transformations conducted on an initial geometric shape during the segmentation.

Again, for illustrative purposes, FIG. 6a shows the example function φ 84 in an image 82.

Figure 6B:
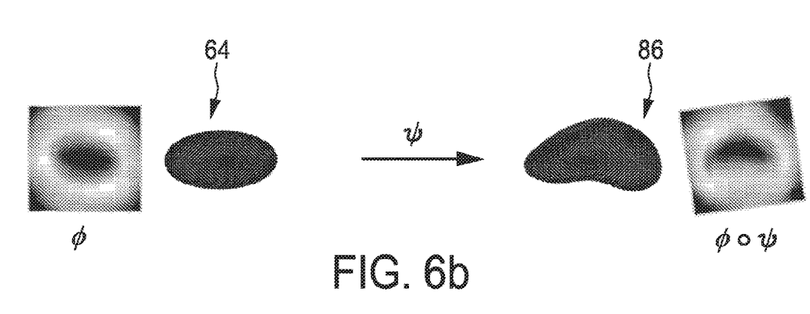

In FIG. 6b, it is shown that the initial geometric shape 64 found in the initialization process explained above out of the basic geometric shape 84 is provided. A transformation ψ is searched for that leads to a deformed model 86 that segments the object out of the normal three-dimensional ultrasound image data and the contrast-enhanced three-dimensional ultrasound image data.

Figure 6C:
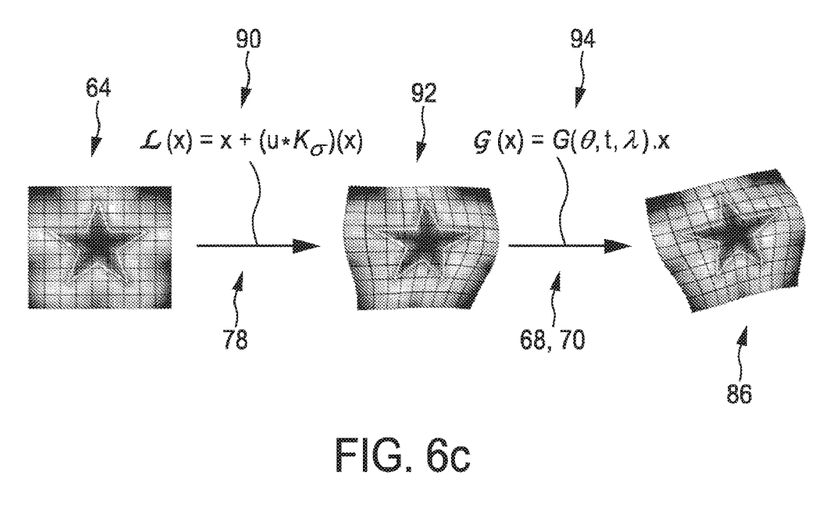

In FIG. 6c, it is, again, shown in detail how the transformation from the initial geometric shape 64 to the deformed model 86 is split up between the local deformation 78 and the global deformation 68, 70. As explained above, a local transformation function 90 is provided that locally deforms the initial geometric shape into a deform shape 92. Then, a global transformation function 94 is supplied to translate, rotate and scale the deform model 92. The corresponding results are shown in FIGS. 7 to 9.

Figure 7:
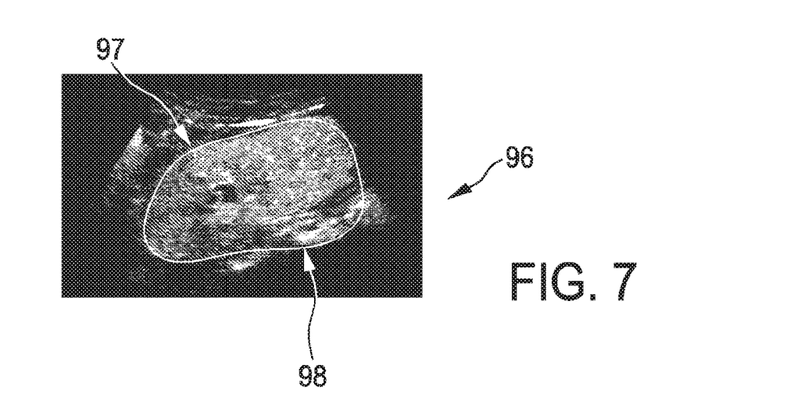
FIG. 7 shows an example of a kidney segmentation in a slice of a normal three-dimensional ultrasound image, wherein the segmentation is conducted based on the normal three-dimensional ultrasound image only.

FIG. 7 shows the results of a prior art segmentation on a contrast-enhanced three-dimensional ultrasound image only. The outcome of such a segmentation process is incorrect since there might be a leakage, for example of blood, in a neighboring structure. Using only such a contrast-enhanced image, dealing with the arising problems is very difficult, because ambitious image information is present.

Image 96 shows that an object 97, in the shown examples in FIG. 79 a kidney, a segment is indicated by a line 98 which, however, is incorrect.

Figure 8:
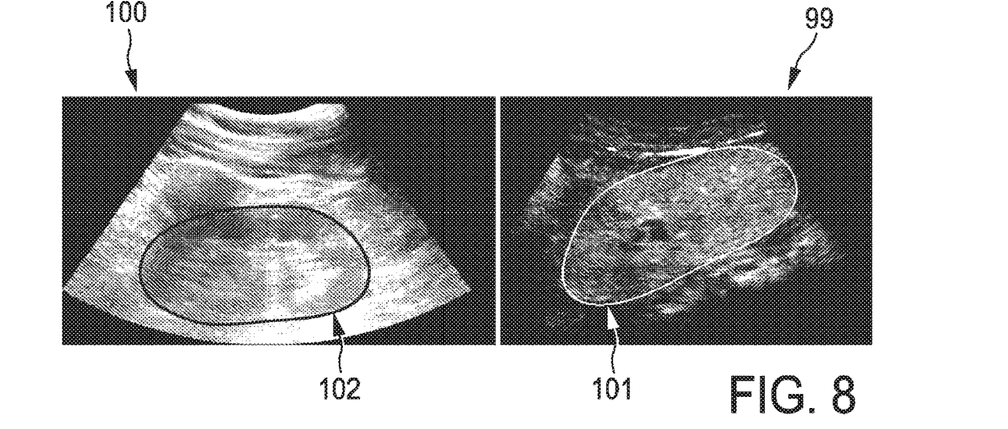
FIG. 8 shows an example of a kidney segmentation in a slice of a normal three-dimensional ultrasound image and a contrast-enhanced three-dimensional ultrasound image, wherein the segmentation is conducted simultaneously in both images.
Figure 9:
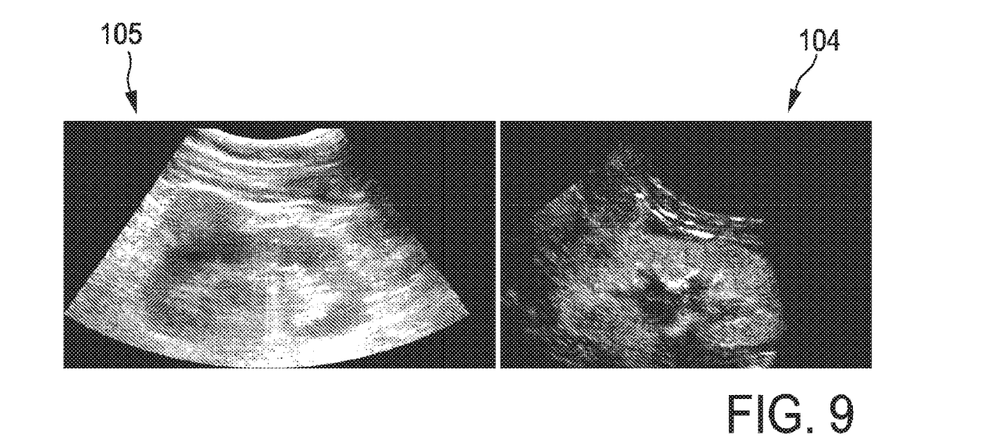
FIG. 9 shows the images in FIG. 8 registered based on the segmentation results.

As FIG. 8 shows, this ambiguity can be solved by using the segmentation method and ultrasound imaging system proposed above. FIG. 8 shows the segmentation of the kidney simultaneously in both the normal ultrasound image 100 and a contrast-enhanced ultrasound image 99. The proposed method in the ultrasound imaging systems will find the same shape in both images. Segmentation will be correct in both images. Slight deviations between the segmented objects 101 and 102 may occur if different sizes are shown in the two images 99, 100.

Further, as in a side outcome the registration transformation is detected, FIG. 9 shows that two registered images, a registered contrast-enhanced ultrasound image 104 and a registered normal ultrasound image 105 may be shown simultaneously as depicted in FIG. 9.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An ultrasound imaging system, comprising:
an image processor in communication with an ultrasound probe comprising a two-dimensional array of transducer elements, wherein the image processor is configured to identify a segmentation boundary on an object using three-dimensional ultrasound image data and contrast-enhanced three-dimensional ultrasound image data obtained by the ultrasound probe,
wherein the image processor is configured to identify the segmentation boundary by minimizing an energy term so that an initial geometric shape is deformed to substantially correspond to a boundary of the object, and
wherein the energy term comprises a first term representing the three-dimensional ultrasound image data and a second term representing the contrast-enhanced three-dimensional ultrasound image data, wherein the initial geometric shape is the same in both the first and the second term, and wherein the first term or the second term comprises a registering transformation for registering the three-dimensional ultrasound image data and the contrast-enhanced three-dimensional ultrasound image data.

2. The ultrasound imaging system of claim 1, further comprising a display configured to receive display data and to provide an image showing the segmentation boundary.

3. The ultrasound imaging system of claim 1, being further configured to deform the initial geometric shape by applying a global transformation and a non-rigid local transformation on the initial geometric shape.

4. The ultrasound imaging system of claim 3, wherein the global transformation is configured to translate, rotate and/or scale the initial geometric shape, and wherein the non-rigid local transformation is configured to apply a displacement field having built-in smoothness on the initial geometric shape, and wherein the energy term further comprises a third term constraining the non-rigid local transformation.

5. The ultrasound imaging system of claim 1, wherein the image processor is further configured to identify the segmentation boundary by detecting the object in the contrast-enhanced three-dimensional ultrasound image data.

6. The ultrasound imaging system of claim 5, wherein the image processor is configured to detect the object by estimating a center, a size and an orientation of a basic geometric shape, and to provide the initial geometric shape by the estimated center, size and orientation of the basic geometric shape.

7. The ultrasound imaging system of claim 1, wherein the image processor is further configured to register the three-dimensional ultrasound image data and the contrast-enhanced three-dimensional ultrasound image data.

8. The ultrasound imaging system of claim 7, wherein the image processor is configured to register by detecting the initial geometric shape in the three-dimensional ultrasound image data by conducting a translation and rotation of the initial geometric shape provided by identifying the segmentation boundary in the contrast-enhanced three-dimensional ultrasound image data.

9. The ultrasound imaging system of claim 1, wherein the registering transformation is affine.

10. The ultrasound imaging system of claim 1, wherein the object comprises a kidney.

11. A method, comprising:
identifying, by an image processor in communication with an ultrasound probe comprising a two-dimensional array of transducer elements, a segmentation boundary on an object using three-dimensional ultrasound image data and contrast-enhanced three-dimensional ultrasound image data obtained by the ultrasound probe,
wherein the identifying comprises minimizing an energy term so that an initial geometric shape is deformed to substantially correspond to a boundary of the object,
wherein the energy term comprises a first term representing the three-dimensional ultrasound image data and a second term representing the contrast-enhanced three-dimensional ultrasound image data, wherein the initial geometric shape is the same in both the first and the second term, and wherein the first term or the second term comprises a registering transformation for registering the three-dimensional ultrasound image data and the contrast-enhanced three-dimensional ultrasound image data.

12. The method of claim 11, displaying an image showing the segmentation boundary.

13. The method of claim 11, wherein deforming the initial geometric shape comprises applying a global transformation and a non-rigid local transformation on the initial geometric shape.

14. The method of claim 13, wherein applying the global transformation comprises translating, rotating and/or scaling the initial geometric shape, and wherein applying the non-rigid local transformation comprises applying a displacement field having built-in smoothness on the initial geometric shape, and wherein the energy term further comprises a third term constraining the non-rigid local transformation.

15. The method of claim 11, wherein identifying the segmentation boundary comprises detecting the object in the contrast-enhanced three-dimensional ultrasound image data.

16. The method of claim 15, wherein detecting the object comprises estimating a center, a size and an orientation of a basic geometric shape, and providing the initial geometric shape by the estimated center, size and orientation of the basic geometric shape.

17. The method of claim 11, further comprising registering the three-dimensional ultrasound image data and the contrast-enhanced three-dimensional ultrasound image data.

18. The method of claim 17, wherein the registering comprises detecting the initial geometric shape in the three-dimensional ultrasound image data by conducting a translation and rotation of the initial geometric shape provided by identifying the segmentation boundary in the contrast-enhanced three-dimensional ultrasound image data.

19. The method of claim 18, wherein the registering transformation is affine.

20. The method of claim 11, wherein the object comprises a kidney.

* * * * *